United States Patent [19]

Kobayashi et al.

[11] 4,381,747
[45] May 3, 1983

[54] IDLING SPEED CONTROL DEVICE OF AN INTERNAL COMBUSTION ENGINE

[75] Inventors: Nobuyuki Kobayashi, Toyota; Hiroshi Itoh, Nagoya; Hiromi Otsuki, Anjo, all of Japan

[73] Assignees: Toyota Jidosha Kogyo Kabushiki Kaisha, Toyota; Nippondenso Co., Ltd., Kariya, both of Japan

[21] Appl. No.: 244,115

[22] Filed: Mar. 16, 1981

[30] Foreign Application Priority Data

Dec. 8, 1980 [JP] Japan .................................. 55-171973

[51] Int. Cl.³ .................... F02D 11/10; F02N 17/00
[52] U.S. Cl. ............................ 123/339; 123/179 L; 123/361; 123/585; 123/588; 310/49 R
[58] Field of Search .............. 123/361, 339, 179 L, 123/585, 586, 588, 589; 310/49 R, 80, 83

[56] References Cited

U.S. PATENT DOCUMENTS

| | | | |
|---|---|---|---|
| 3,504,253 | 3/1970 | Kavanaugh | 310/49 R |
| 3,549,918 | 12/1970 | Croymans | 310/49 R |
| 3,661,131 | 5/1972 | Croft | 123/339 |
| 3,693,034 | 9/1972 | Inariba | 310/49 R |
| 3,964,457 | 6/1976 | Coscia | 123/588 |
| 4,145,165 | 3/1979 | Perkins | 310/80 |
| 4,237,833 | 12/1980 | Des Lauriers | 123/339 |

*Primary Examiner*—Ronald B. Cox
*Attorney, Agent, or Firm*—Cushman, Darby & Cushman

[57] ABSTRACT

An idling speed control device of an internal combustion engine having a bypass passage which interconnects the intake passage located upstream of the throttle valve to the intake passage located downstream of the throttle valve has a flow control valve device arranged in the bypass passage and actuated by a stepper motor for controlling the amount of air flowing within the bypass passage to maintain the idling speed of the engine at a predetermined speed. The flow control valve device comprises a valve chamber having an air inlet opening and an air outlet opening which is connected to the intake passage located downstream of the throttle valve. The air inlet opening is formed on the inner bottom wall of the valve chamber and connected via the bypass passage to the intake passage located upstream of the throttle valve.

12 Claims, 12 Drawing Figures

IDLING SPEED CONTROL DEVICE OF AN INTERNAL COMBUSTION ENGINE

BACKGROUND OF THE INVENTION

The present invention relates to an idling speed control device of an internal combustion engine.

In order to control the number of revolutions per minute of an engine so that it becomes equal to a predetermined number when the engine is idling, the applicant has proposed an idling speed control device in which a bypass passage branches off from the intake passage of the engine, which is located upstream of a throttle value, and connected again to the intake passage located downstream of the throttle valve, with a flow control valve device being arranged in the bypass passage. The flow control valve device is driven by a stepper motor for controlling the amount of air flowing within the bypass passage at the time of idling. In this idling speed control device, the flow control valve device comprises a valve chamber having an air inlet opening and an air outlet opening, and the amount of air flowing within the bypass passage is controlled in such a way that the flow area of the air outlet opening of the valve chamber is changed by a control valve which is driven by the stepper motor. However, since the air flowing within the bypass passage contains water vapor therein, when the flow control valve device is used for a long time, water gradually accumulates in the valve chamber. As a result of this, in a cold season since the water accumulated in the valve chamber is frozen, the control valve freezes to the housing of the flow control valve device and, thus, there is the possibility that the control valve cannot move.

SUMMARY OF THE PRESENT INVENTION

An object of the present invention is to provide an idling speed control device capable of preventing the control valve from freezening to the housing of the idling speed control device.

According to the present invention, there is provided an idling speed control device of an internal combustion engine having an intake passage and a throttle valve arranged in the intake passage. The device includes a bypass passage interconnecting the intake passage located upstream of the throttle valve to the intake passage located downstream of the throttle valve. A valve is arranged in the bypass passage and has a valve chamber which has an air inlet opening and an air outlet opening, the air inlet opening being formed on an inner bottom wall of the valve chamber and connected via the bypass passage to the intake passage located upstream of the throttle valve. The valve includes a control valve for controlling a flow area of said air outlet opening which is connected to the intake passage located downstream of the throttle valve. A stepper motor is connected to said control valve for controlling the amount of air flowing within said bypass passage in accordance with a change in the operating condition of the engine when it is idling.

The present invention may be more fully understood from the description of a preferred embodiment of the invention set forth below, together with the accompanying drawings.

DESCRIPTION OF A PREFERRED EMBODIMENT

Figure 1:
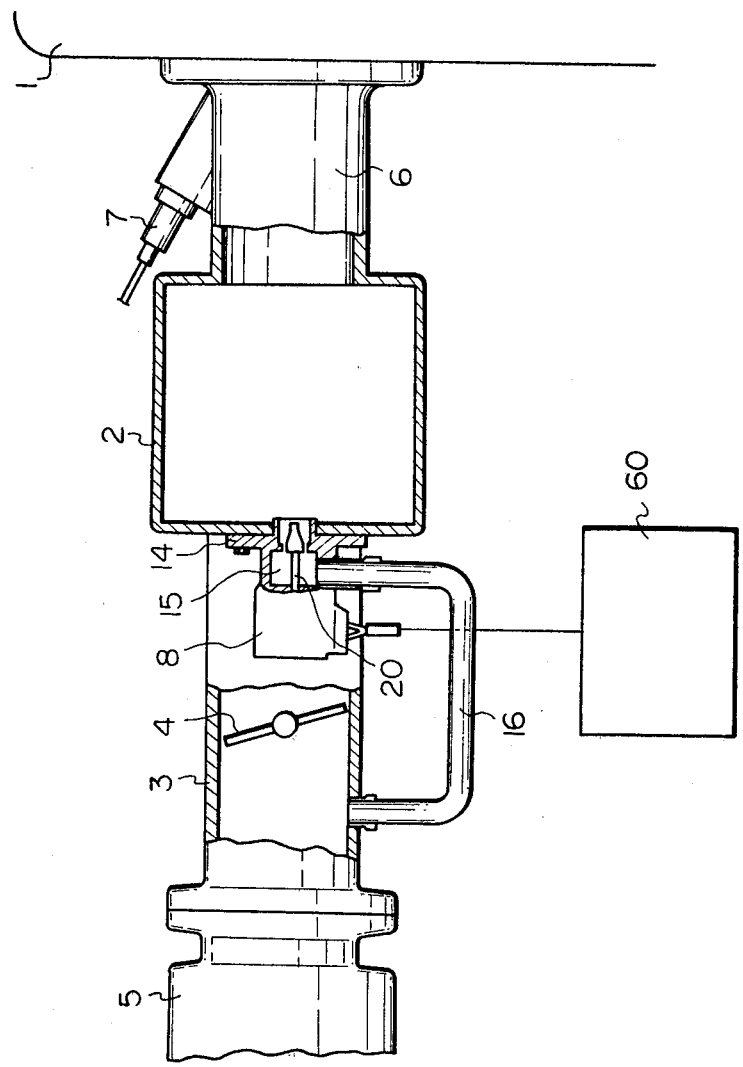
FIG. 1 a side view, partly in cross-section, of an intake system equipped with an idling speed control device according to the present invention.
Figure 2:
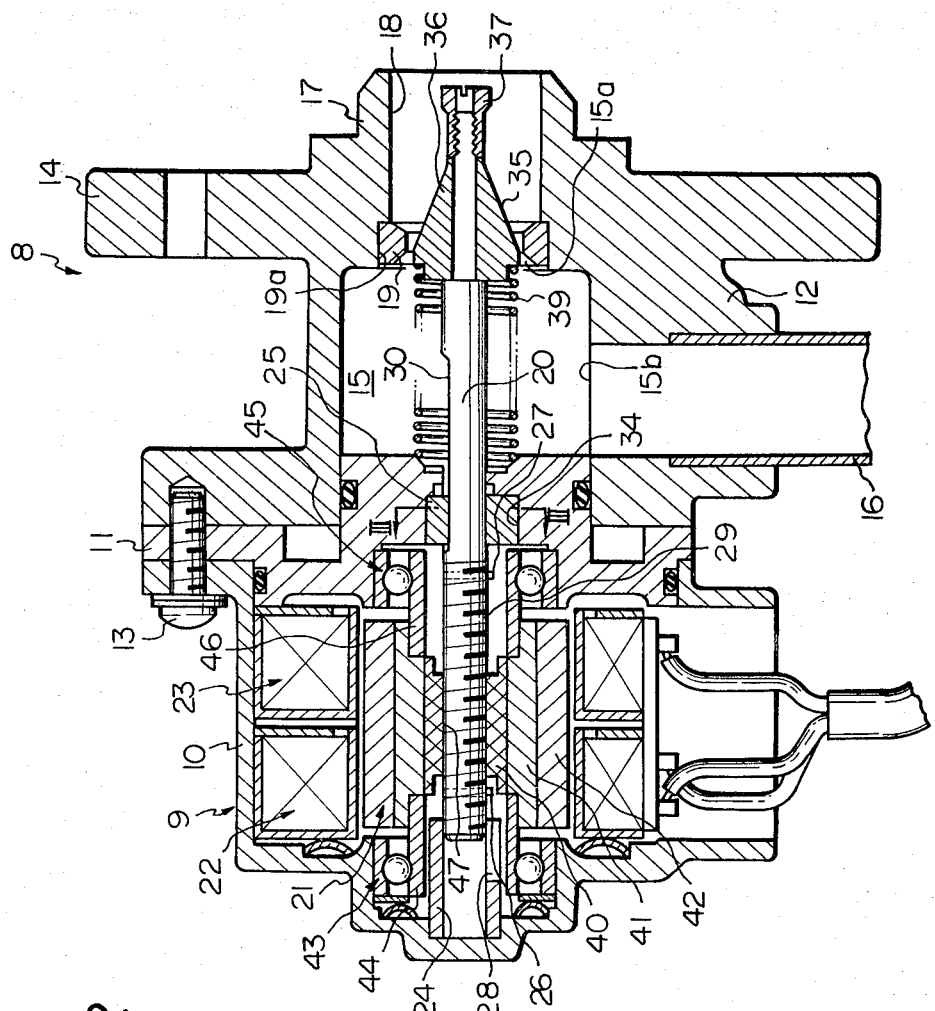
FIG. 2 is a cross-sectional side view of a flow control valve device.

Referring to FIG. 1, 1 designates an engine body, 2 a surge tank, 3 an intake duct, 4 a throttle valve and 5 an air flow meter. The inside of the intake duct 3 is connected to the atmosphere via the air flow meter 5 and an air cleaner (not shown). The surge tank 2, which is common to all the cylinders of the engine, has a plurality of branch pipes 6, each being connected to the corresponding cylinder of the engine. A fuel injector 7 is provided for each cylinder and mounted on the corresponding branch pipe 6. In addition, a flow control valve device 8 is mounted on the surge tank 2. As illustrated in FIG. 2, the flow control valve device 8 comprises a motor housing 10 of a stepper motor 9, a motor housing end plate 11 and a valve housing 12. The motor housing 10, the end plate 11 and the valve housing 12 are interconnected to each other by means of bolts 13. As illustrated in FIGS. 1 and 2, a flange 14 is formed in one piece on the valve housing 12 and fixed onto the vertically extending outer side wall of the surge tank 2. A valve chamber 15 is formed in the valve housing 12 and comprises an air outlet opening 15a formed on the vertically extending inner side wall thereof, and an air inlet opening 15b formed on the horizontally extending inner bottom wall thereof. The air inlet opening 15b of the valve chamber 15 is connected to a downwardly extending end of a bypass pipe 16, and the other end of the bypass pipe 16 is connected to the inside of the intake duct 3, which is located upstream of the throttle valve 4, as illustrated in FIG. 1. On the other hand, as illustrated in FIG. 2, a horizontally extending hollow cylindrical projection 17, projecting into the surge tank 2, is formed in one piece on the side wall of the flange 14, and a cylindrical air outflow bore 18, connected to the air outlet opening 15a of the valve chamber 15, is formed in the hollow cylindrical projection 17. An annular groove 19a is formed on the inner end of the air outflow bore 18, and a valve seat 19 is fitted into the annular groove 19a.

Figure 3:
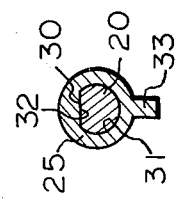
FIG. 3 is a cross-sectional view taken along the line III—III in FIG. 2.
Figure 4:
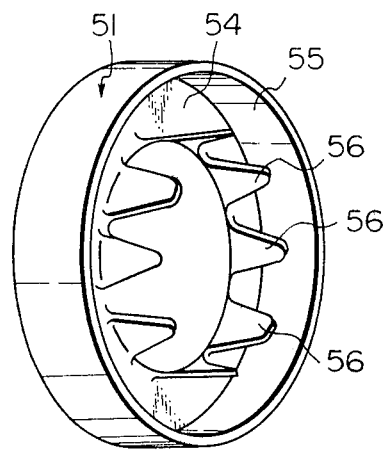
FIG. 4 is a perspective view of a stator core member.
Figure 5:
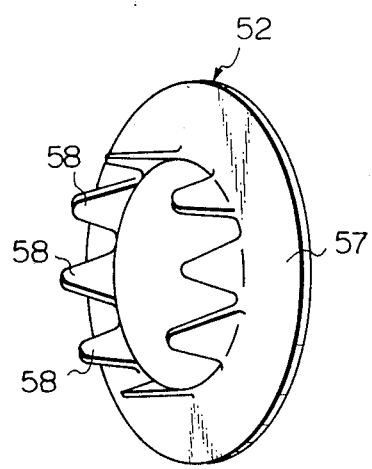
FIG. 5 is a perspective view of a stator core member.

As illustrated in FIG. 2, the stepper motor 9 comprises a valve shaft 20, a rotor 21 coaxially arranged with the valve shaft 20, and a pair of stators 22, 23, each being stationarily arranged in the motor housing 10 and spaced from the cylindrical outer wall of the rotor 21 by a slight distance. As illustrated in FIGS. 1 and 2, the valve shaft 20 is horizontally arranged so that the vibration of the engine does not act on the valve shaft 20 in the axial direction thereof. As illustrated in FIG. 2, the end portion of the valve shaft 20 is supported by a hollow cylindrical bearing 24 made of a sintered metal and fixed onto the motor housing 10, and the intermediate portion of the valve shaft 20 is supported by a hollow cylindrical bearing 25 made of a sintered metal and fixed onto the end plate 11. A first stop pin 26, which abuts against the rotor 21 when the valve shaft 20 reaches the most advanced position, is fixed onto the valve shaft 20, and a second stop pin 27, which abuts against the rotor 21 when the valve shaft 20 reaches the most retracted position, is fixed onto the valve shaft 20. In addition, an axially extending slot 28, into which the first stop pin 26 is able to enter, is formed in the bearing 24. External screw threads 29 are formed on the outer circumferential wall of the valve shaft 20, which is located within the motor housing 10. The external screw threads 29 extend towards the right in FIG. 2 from the left end of the valve shaft 20 and terminate at a position wherein the valve shaft 20 passes through the second stop pin 27 by a slight distance. In addition, an axially extending flat portion 30, which extends towards the right in FIG. 2 from a position near the terminating position of the external screw threads 29, is formed on the outer circumferential wall of the valve shaft 20. As illustrated in FIG. 3, the inner wall of the shaft bearing hole of the bearing 25 comprises a cylindrical wall portion 31 and a flat wall portion 32 which have a complementary shape relative to the outer circumferential wall of the valve shaft 20. Consequently, the valve shaft 20 is supported by the bearing 25 so that the valve shaft 20 cannot be rotated, but is able to slide in the axial direction. In addition, as illustrated in FIG. 3, an outwardly projecting arm 33 is formed in one piece on the outer circumferential wall of the bearing 25, and a bearing receiving hole 34 (FIG. 2), having a contour shape which is the same as that of the bearing 25, is formed on the inner wall of the end plate 11. Consequently, when the bearing 25 is fitted into the bearing receiving hole 34, as illustrated in FIG. 2, the bearing 25 is non-rotatably supported by the end plate 11. A valve head 36, having a substantially conical shaped outer wall 35, is secured onto the tip of the valve shaft 20 by means of a nut 37, and an annular air outlet opening 15a is formed between the valve seat 19 and the conical outer wall 35 of the valve head 36. In addition, a compression spring 39 is inserted between the valve head 36 and the end plate 11 in the valve chamber 15.

As illustrated in FIG. 2, the rotor 21 comprises a hollow cylindrical inner body 40 made of a synthetic risin, a hollow cylindrical intermediate body 41 made of a metallic material and rigidly fitted onto the outer circumferential wall of the hollow cylindrical inner body 40, and a hollow cylindrical outer body 42 made of a permanent magnet and fixed onto the outer circumferential wall of the hollow cylindrical intermediate body 41 by using an adhesive. As will be hereinafter described, a N pole and a S pole are alternately formed on the outer circumferential wall of the hollow cylindrical outer body 42 made of a permanent magnet along the circumferential direction of the outer circumferential wall of the hollow cylindrical outer body 42. As illustrated in FIG. 2, one end of the hollow cylindrical intermediate body 41 is supported by the inner race 44 of a ball bearing 43 which is supported by the motor housing 10, and the other end of the hollow cylindrical intermediate body 41 is supported by the inner race 46 of a ball bearing 45 which is supported by the end plate 11. Consequently, the rotor 21 is rotatably supported by a pair of the ball bearings 43 and 45. Internal screw threads 47, which are in engagement with the external screw threads 29 of the valve shaft 20, are formed on the inner wall of the central bore of the hollow cylindrical inner body 40. Therefore, when the rotor 21 rotates, the valve shaft 20 is caused to move in the axial direction.

Figure 6:
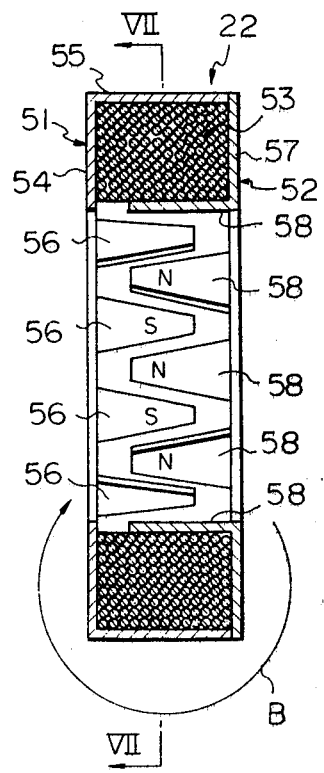
FIG. 6 is a cross-sectional side view of a stator.
Figure 7:
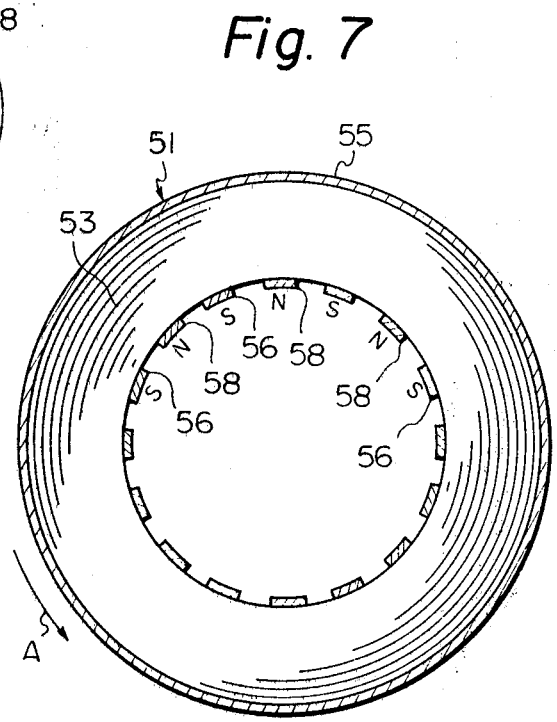
FIG. 7 is a cross-sectional view taken along the line VII—VII in FIG. 6.

The stators 22 and 23, which are stationarily arranged in the motor housing 10, have the same construction and, therefore, the construction of only the stator 22 will be hereinafter described with reference to FIGS. 4 through 7. Referring to FIGS. 4 through 7, the stator 22 comprises a pair of stator core members 51 and 52, and a stator coil 53. The stator core member 51 comprises an annular side wall portion 54, an outer cylindrical portion 55, and eight pole pieces 56 extending perpendicular to the annular side wall portion 54 from the inner periphery of the annular side wall portion 54. The pole pieces 56 have a substantially triangular shape, and each of the pole pieces 56 is spaced from the adjacent pole piece 56 by the same angular distance. On the other hand, the stator core member 52 comprises an annular side wall portion 57 and eight pole pieces 58 extending perpendicular to the annular side wall portion 57 from the inner periphery of the annular side wall portion 57. The pole pieces 58 have a substantially triangular shape, and each of the pole pieces 58 is spaced from the adjacent pole piece 58 by the same angular distance. The stator core members 51 and 52 are assembled so that each of the pole pieces 56 is spaced from the adjacent pole piece 58 by the same angular distance as illustrated in FIGS. 6 and 7. When the stator core members 51 and 52 are assembled, the stator core members 51 and 52 construct a stator core. When an electric current is fed into the stator coil 53 and flows within the stator coil 53 in the direction illustrated by the arrow A in FIG. 7, a magnetic field, the direction of which is as illustrated by the arrow B in FIG. 6, is generated around the stator coil 53. As a result of this, the S poles are produced in the pole pieces 56 and, at the same time, the N poles are produced in the pole pieces 58. Consequently, it will be understood that the N pole and the S pole are alternately formed on the inner circumferential wall of the stator 22. On the other hand, if an electric current flows within the stator coil 22 in the direction which is opposite to that illustrated by the arrow A in FIG. 7, the N poles are produced in the pole pieces 56 and, at the same time, the S poles are produced in the pole pieces 58.

Figure 8:
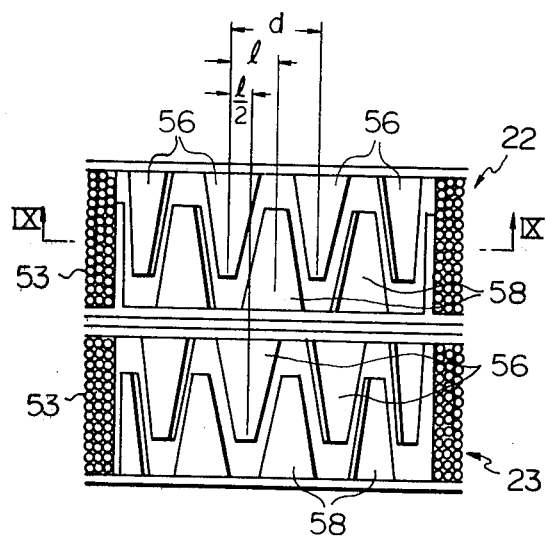
FIG. 8 is a cross-sectional plan view of the stator illustrated in FIG. 2.
Figure 9:
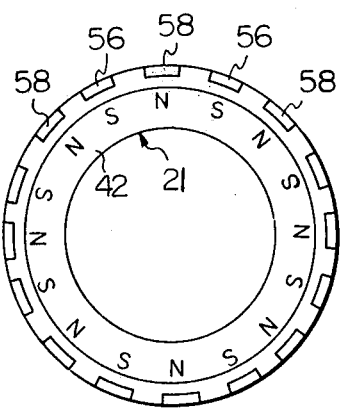
FIG. 9 is a schematic cross-sectional side view taken along the line IX—IX in FIG. 8.

FIG. 8 illustrates the case wherein the stators 22 and the stator 23 are arranged in tandem as illustrated in FIG. 2. In FIG. 8, similar components of the stator 23 are indicated with the same reference numerals used in the stator 22. As illustrated in FIG. 8, assuming that the distance between the pole piece 56 of the stator 22 and the adjacent pole piece 58 of the stator 22 is indicated by l, each of the pole pieces 56 of the stator 23 is offset by 1/2 from the pole piece 56 of the stator 22, which is arranged nearest to the pole piece 56 of the stator 23. That is, assuming that the distance d between the adjacent pole pieces 56 of the stator 23 is one pitch, each of the pole pieces 56 of the stator 23 is offset by a ¼ pitch from the pole piece 56 of the stator 22, which is arranged nearest to the pole piece 56 of the stator 23. On the other hand, as illustrated in FIG. 9, the N pole and the S pole are alternately formed on the outer circumferential wall of the hollow cylindrical outer body 42 of the rotor 21 along the circumferential direction of the outer circumferential wall of the hollow cylindrical outer body 42, and the distance between the N pole and the S pole, which are arranged adjacent to each other, is equal to the distance between the pole piece 56 and the pole piece 58 of the stator 22 or 23, which are arranged adjacent to each other.

Figure 10:
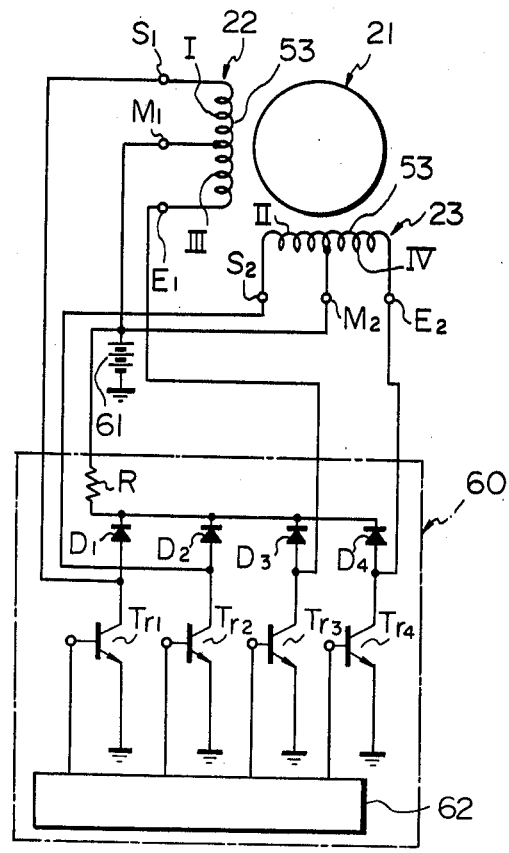
FIG. 10 is a drive control circuit diagram of a stepper motor.

FIG. 10 illustrates a drive control circuit for the stepper motor 9 illustrated in FIG. 2. In FIG. 8, the stator coil 53 of the stator 22 is wound in the direction which is the same as the winding direction of the stator coil 53 of the stator 23. In FIG. 10, the winding start terminals of the stator coils 53 of the stators 22 and 23 are indicated by $S_1$ and $S_2$, respectively, and the winding end terminals of the stator coils 53 of the stators 22 and 23 are indicated by $E_1$ and $E_2$, respectively. In addition, in FIG. 10, the intermediate taps of the stator coils 53 of the stators 22 and 23 are indicated by $M_1$ and $M_2$, respectively. In the stator 22, the stator coil 53, located between the winding start terminal $S_1$ and the intermediate tap $M_1$, constitutes a first phase exciting coil I, and the stator coil 53, located between the winding end terminal $E_1$ and the intermediate tap $M_1$, constitutes a second phase exciting coil II. In addition, in the stator 23 the stator coil 53, located between the winding start terminal $S_2$ and the intermediate terminal $M_2$, constitutes a third phase exciting coil III, and the stator coil 53, located between the winding end terminal $E_2$ and the intermediate tap $M_2$, constitutes a fourth phase exciting coil IV. As illustrated in FIG. 10, the drive control circuit 60 comprises four transistors $Tr_1$, $Tr_2$, $Tr_3$ and $Tr_4$, and the winding start terminals $S_1$ and $S_2$ and the winding end terminals $E_1$ and $E_2$ are connected to the collectors of the transistors $Tr_1$, $Tr_2$, $Tr_3$ and $Tr_4$, respectively. In addition, the intermediate taps $M_1$ and $M_2$ are gounded via a power source 61. The collectors of the transistors $Tr_1$, $Tr_2$, $Tr_3$ and $Tr_4$ are connected to the power source 61 via corresponding diodes $D_1$, $D_2$, $D_3$ and $D_4$ for absorbing a surge current and via a resistor R, and the emitters of the transistors $Tr_1$, $Tr_2$, $Tr_3$ and $Tr_4$ are grounded. In addition, the bases of the transistors $Tr_1$, $Tr_2$, $Tr_3$ and $Tr_4$ are connected to a control pulse generating circuit 62.

Figure 11:
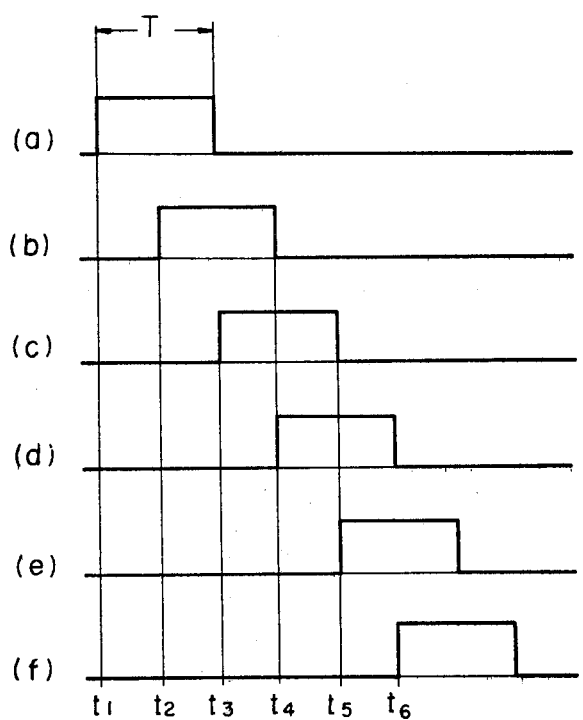
FIG. 11 is a time chart of control pulses of a stepper motor.

FIG. 11 illustrates control pulses applied to the bases of the transistors $Tr_1$, $Tr_2$, $Tr_3$ and $Tr_4$ from the control pulse generating circuit 62. FIG. 11(a) and FIG. 11(e) indicate the control pulses applied to the base of the transistor $Tr_1$; FIG. 11(b) and FIG. 11(f) indicate the control pulses applied to the base of the transistor $Tr_2$; FIG. 11(c) indicates the control pulse applied to the base of the transistor $Tr_3$, and; FIG. 11(d) indicates the control pulse applied to the base of the transistor $Tr_4$. When the control pulse is applied to the base of the transistor $Tr_1$ as illustrated in FIG. 11(a), since the transistor $Tr_1$ is turned to the ON condition, the first phase exciting coil I is excited. In addition, as illustrated in FIGS. 11(b), 11(c) and 11(d), when the control pulse is applied to the bases of the transistors $Tr_2$, $Tr_3$ and $Tr_4$, the second phase exciting coil II, the third phase exciting coil III and the fourth phase exciting coil IV are excited, respectively. Consequently, when the control pulse is successively applied to the bases of the transistors $Tr_1$, $Tr_2$, $Tr_3$ and $Tr_4$, the exciting coils I, II, III and IV are successively excited. From FIG. 11, it will be understood that the widths of all the control pulses are the same, and each of the control pulses is generated at the same time interval. In addition, as illustrated in FIG. 11, only the control pulse for the first phase exciting coil I is generated between the time $t_1$ and the time $t_2$, and both the control pulse for the first phase exciting coil I and the control pulse for the second phase exciting coil II are generated between the time $t_2$ and the time $t_3$. In addition, both the control pulse for the second phase exciting coil II and the control pulse for the third phase exciting coil III are generated between the time $t_3$ and the time $t_4$, and both the control pulse for the third phase exciting coil III and control pulse for the fourth phase exciting coil IV are generated between the time $t_4$ and the time $t_5$. Consequently, it will be understood that, after the time $t_2$, the exciting coils I, II, III and IV are driven by a two phase voltage.

Figure 12:
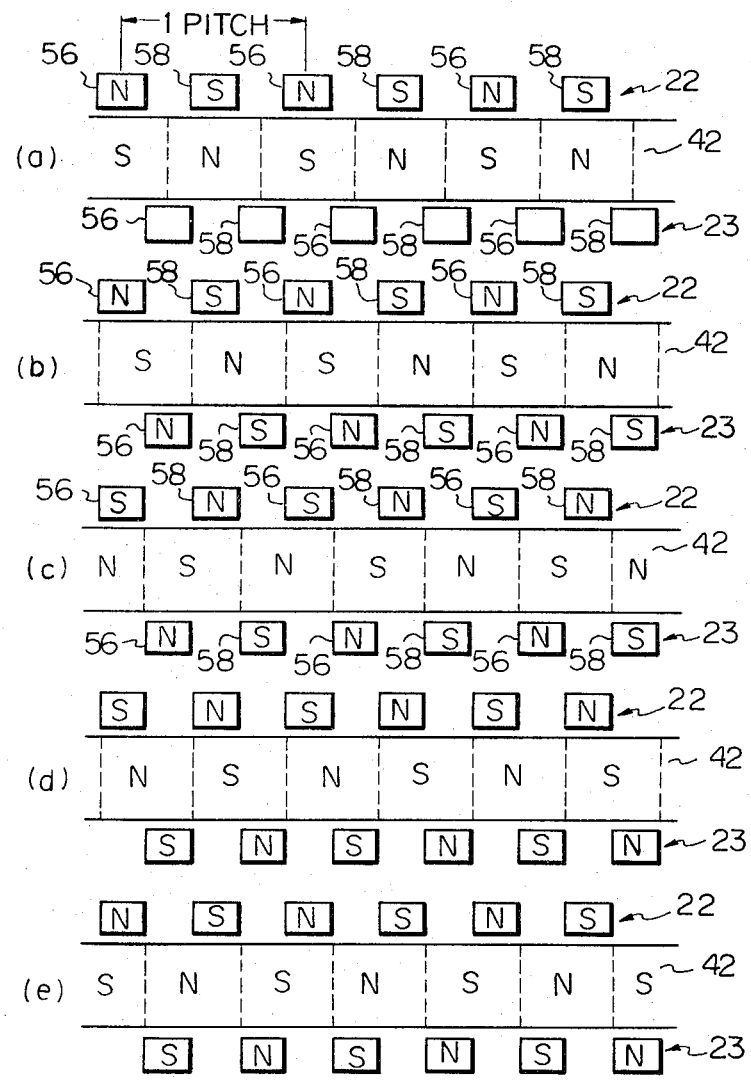
FIG. 12 is a schematically illustrative view of the stator and the rotor of a stepper motor.

FIG. 12 illustrates a schematic developed view of the outer circumferential surface of the hollow cylindrical outer body 42 of the rotor 21 and the pole pieces 56, 58 of the stators 22, 23. FIG. 12(a) illustrates the case wherein only the first phase exciting coil I is excited as illustrated between the time $t_1$ and the time $t_2$ in FIG. 11. At this time, the polarity of the pole pieces 56 of the stator 22 is N, and the polarity of the pole pieces 58 of the stator 22 is S. Contrary to this, the polarity does not appear on the pole pieces 56, 58 of the stator 23. Consequently, at this time, the rotor 21 remains stopped at a position wherein each of the pole pieces 56 of the stator 22 face the corresponding S pole of the hollow cylindrical outer body 42, and each of the pole pieces 58 of the stator 22 face the corresponding N pole of the hollow cylindrical outer body 42. When the second phase exciting coil II is excited, as illustrated between the time $t_2$ and the time $t_3$ in FIG. 11, since the flow direction of the current in the secondary phase exciting coil II is the same as that of the current in the first phase exciting coil I, the polarity of the pole pieces 56 of the stator 23 becomes N, and the polarity of the pole pieces 58 of the stator 23 becomes S, as illustrated in FIG. 12(b). Consequently, at this time, the hollow cylindrical outer body 42 moves to a position wherein each of the S poles of the hollow cylindrical outer body 42 is located between the corresponding pole pieces 56 of the stator 22 and the corresponding pole pieces 56 of the stator 23, and each of the N poles of the hollow cylindrical outer body 42 is located between the corresponding pole pieces 58 of the stator 22 and the corresponding pole pieces 58 of the stator 23. Therefore, assuming that the distance between the adjacent two pole pieces 56 of the stator 22 is one pitch, as mentioned previously, the hollow cylindrical outer body 42 moves by a ¼ pitch towards the right in FIG. 12 from a position illustrated in FIG. 12(a) to a position illustrated in FIG. 12(b).

After this, when the third phase exciting coil III is excited, as illustrated between the time $t_3$ and the time $t_4$, since the flow direction of the current in the third phase exciting coil III is opposite to that of the current in the first phase exciting coil I, the polarity of the pole pieces 56 of the stator 22 becomes S, and the polarity of the pole pieces 58 of the stator 22 becomes N as illustrated in FIG. 12(c). As a result of this, the hollow cylindrical outer body 42 moves by a ¼ pitch towards the right in FIG. 12 from a position illustrated in FIG. 12(b) to a position illustrated in FIG. 12(c). As in the same manner as described above, when the fourth phase exciting coil IV is excited, as illustrated between the time $t_4$ and the time $t_5$ in FIG. 11, the hollow cylindrical outer body 42 moves by a ¼ pitch towards the right in FIG. 12 from a position illustrated in FIG. 12(c) to a position illustrated in FIG. 12(d). After this, when the first phase exciting coil I is excited again, as illustrated between the time $t_5$ and the time $t_6$ in FIG. 11, the hollow cylindrical outer body 42 moves by a ¼ pitch towards the right in FIG. 12 from a position illustrated in FIG. 12(d) to a position illustrated in FIG. 12(e).

As mentioned above, when the exciting coils I, II, III and IV are successively excited from the first phase exciting coil I to the fourth phase exciting coil IV, the hollow cylindrical outer body 42 of the rotor 21 moves relative to the stators 22, 23 and, accordingly, the rotor 21 rotates in one direction. When the rotor 21 rotates, since the external screw threads 29 of the valve shaft 20 are in engagement with the internal screw threads 47 of the hollow cylindrical inner body 40, as illustrated in FIG. 2, the valve shaft 20 is caused to move in one direction, for example, towards the left in FIG. 2. As a result of this, since the cross-sectional area of the annular air outlet opening 15b formed between the valve head 36 and the valve seat 19 is increased, in FIG. 1, the amount of air fed via the bypass pipe 16 into the surge tank 2 from the intake duct 3 located upstream of the throttle valve 4 is increased. Contrary to this, in FIG. 10, if, firstly, the control pulse is applied to the base of the transistor $Tr_4$ and then successively applied to the bases of the transistors $Tr_3$, $Tr_2$ and $Tr_1$, the rotor 21 rotates in a direction which is opposite to the rotating direction in the case wherein the control pulse is successively applied to the bases of the transistors $Tr_1$, $Tr_2$, $Tr_3$ and $Tr_4$. As a result of this, since the valve shaft 20 is caused to move towards the right in FIG. 2, the cross-sectional area of the annular air outlet opening 15a formed between the valve head 36 and the valve seat 19 is reduced. As mentioned above, the cross-sectional area of the annular air outlet opening 15a is controlled by the control pulse produced from the control pulse generating circuit 62 illustrated in FIG. 10. The control pulse generating circuit 62 produces the control pulse in response to, for example, the output signal of an engine rotating speed sensor (not shown), and the amount of air fed into the surge tank 2 via the bypass pipe 16 is increased or reduced so that the number of revolutions per minute of the engine is maintained at a predetermined valve.

As illustrated in FIGS. 1 and 2, the air inlet opening 15b, connected to the bypass pipe 16, is formed on the inner bottom wall of the valve chamber 15. Consequently, water, contained in air passing through the bypass pipe 16, is accumulated in the bypass pipe 16, but is not accumulated in the valve chamber 15. However, practically, since air flows within the bypass passage 16 at a high speed, even if water droplets adhere onto the inner wall of the bypass pipe 16, such water droplets are instantaneously vaporized. Therefore, water, contained in air passing through the bypass pipe 16, does not accumulated in the bypass pipe 16. As mentioned above, in the present invention, since water is not accumulated in the valve chamber 15, there is no possibility the water is frozen in the valve chamber 15. As a result of this, it is possible to prevent the valve shaft 20 from freezing to the housing end plate 11 or the bearing 25.

While the invention has been described by reference to a specific embodiment chosen for purposes of illustration, it should be apparent that numerous modifications could be made thereto by those skilled in the art without departing from the basic concept and scope of the invention.

What is claimed is:

1. An idling speed control device of an internal combustion engine having an intake passage and a throttle valve arranged in the intake passage, said device comprising:
    a bypass passage interconnecting the intake passage located upstream of the throttle valve to the intake passage located downstream of the throttle valve;
    valve means arranged in said bypass passage and having a valve chamber which has an air inlet opening and an air outlet opening, said air inlet opening being formed on an inner bottom wall of said valve chamber and connected via said bypass passage to the intake passage located upstream of the throttle valve, said valve means having a control valve for controlling a flow area of said air outlet opening which is connected to the intake passage located downstream of the throttle valve, and;
    a stepper motor connected to said control valve for controlling the amount of air flowing within said bypass passage in accordance with a change in the operating condition of the engine at the time of idling, and
    wherein said stepper motor includes a motor housing, a stator stationarily arranged in said motor housing, a rotor, and a valve shaft axially movable in said motor housing and actuated by said rotor, said control valve being fixed onto said valve shaft, and
    wherein said rotor includes a hollow cylindrical outer body made of a permanent magnet, a hollow cylindrical inner body made of a synthetic resin and rotably mounted on said valve shaft and a hollow cylindrical intermediate body interposed between said hollow cylindrical inner and outer bodies and made of a metallic material, said hollow cylindrical intermediate body being supported on said motor housing by means of bearings.

2. An idling speed control device as claimed in claim 1, wherein said rotor is rotatably mounted on said valve shaft via a transforming mechanism which transforms the rotating motion of said rotor to the axial movement of said valve shaft.

3. An idling speed control device as claimed in claim 2, wherein said transforming mechanism comprises external screw threads formed on an outer circumferential wall of said valve shaft, and internal screw threads formed in a central bore of said rotor and being in engagement with the external screw threads of said valve shaft.

4. An idling speed control device as claimed in claim 1, wherein said hollow cylindrical outer body has an outer circumferential wall on which a north pole and a south pole are alternately formed.

5. An idling speed control device as claimed in claim 1, wherein said hollow cylindrical inner body has a center hole in which internal screw threads are formed, said valve shaft having external screw threads which are in engagement with the internal screw threads of said hollow cylindrical inner body.

6. An idling speed control device as claimed in claim 1, wherein said stator comprises first and second stator cores, each having a stator coil and a plurality of spaced pole pieces which are arranged along an outer circumferential wall of said rotor and are spaced from the outer circumferential wall of said rotor by a slight distance.

7. An idling speed control device as claimed in claim 6, wherein each of said stator cores comprises a first core member having an annular plate, and a second core member having an annular plate, said spaced pole pieces comprising a first pole piece group extending perpendicular to the annular plate of said first core member from an inner periphery of the annular plate of said first core member, and a second pole piece group extending perpendicular to the annular plate of said second core member from an inner periphery of the annular plate of said second core member, each of the pole pieces of said first pole piece group and each of the pole pieces of said second pole piece group being alternately arranged.

8. An idling speed control device as claimed in claim 6, wherein each of the pole pieces of said first stator core is offset from the corresponding pole piece of said second stator core by a ¼ pitch.

9. An idling speed control device as claimed in claim 6, wherein each of the stator coils comprises a winding start terminal, an intermediate tap and an winding end terminal.

10. An idling speed control device as claimed in claim 1, wherein said valve shaft is nonrotatably supported by said motor housing.

11. An idling speed control device as claimed in claim 1, wherein said valve means comprises a compression spring arranged in said valve chamber for continually biasing said control valve in a predetermined direction.

12. An idling speed control device as claimed in claim 11, wherein said compression spring is arranged between said control valve and an inner wall of said valve housing for biasing said control valve towards said air outlet opening.

* * * * *